United States Patent [19]

Page et al.

[11] 4,270,328
[45] Jun. 2, 1981

[54] FASTENER MEANS FOR INTERIOR TRIM PANEL

[75] Inventors: Norman B. Page, Sterling Heights; Leslie W. Bursott, Utica, both of Mich.

[73] Assignee: General Motors Corporation, Detroit, Mich.

[21] Appl. No.: 105,276

[22] Filed: Dec. 19, 1979

[51] Int. Cl.³ .............................................. E04C 1/40
[52] U.S. Cl. ...................................... 52/511; 52/717; 24/204; 24/213 R
[58] Field of Search ........................ 52/511, 512, 717; 24/204, 213

[56] References Cited

U.S. PATENT DOCUMENTS

| | | | |
|---|---|---|---|
| 3,266,113 | 8/1966 | Flanagan | 24/204 |
| 3,505,772 | 4/1970 | DeClaire | 52/717 |
| 3,708,833 | 1/1973 | Rebich | 24/204 |
| 3,720,030 | 3/1973 | Krodel | 52/717 |
| 3,808,648 | 5/1974 | Billarant | 24/213 R |
| 4,012,544 | 3/1977 | Richards | 24/204 |
| 4,035,874 | 7/1977 | Liliendahl | 24/213 R |

FOREIGN PATENT DOCUMENTS 264770 9/1968 Austria ...................................... 24/204

Primary Examiner—James A. Leppink
Assistant Examiner—Henry E. Raduazo
Attorney, Agent, or Firm—Arthur N. Krein

[57] ABSTRACT

A fastener device used to mount, for example, a trim panel to a support panel in a vehicle body, the support panel having a push-in stud extending therefrom. The fastener device, in a preferred embodiment, includes a retainer base on the trim panel which is used to support a multi-holed retainer movably thereon. The multi-holed retainer is provided with a plurality of stud receiving holes extending therethrough in closely spaced relationship to each other whereby to define a honeycomb cellular core structure separating adjacent holes.

3 Claims, 5 Drawing Figures

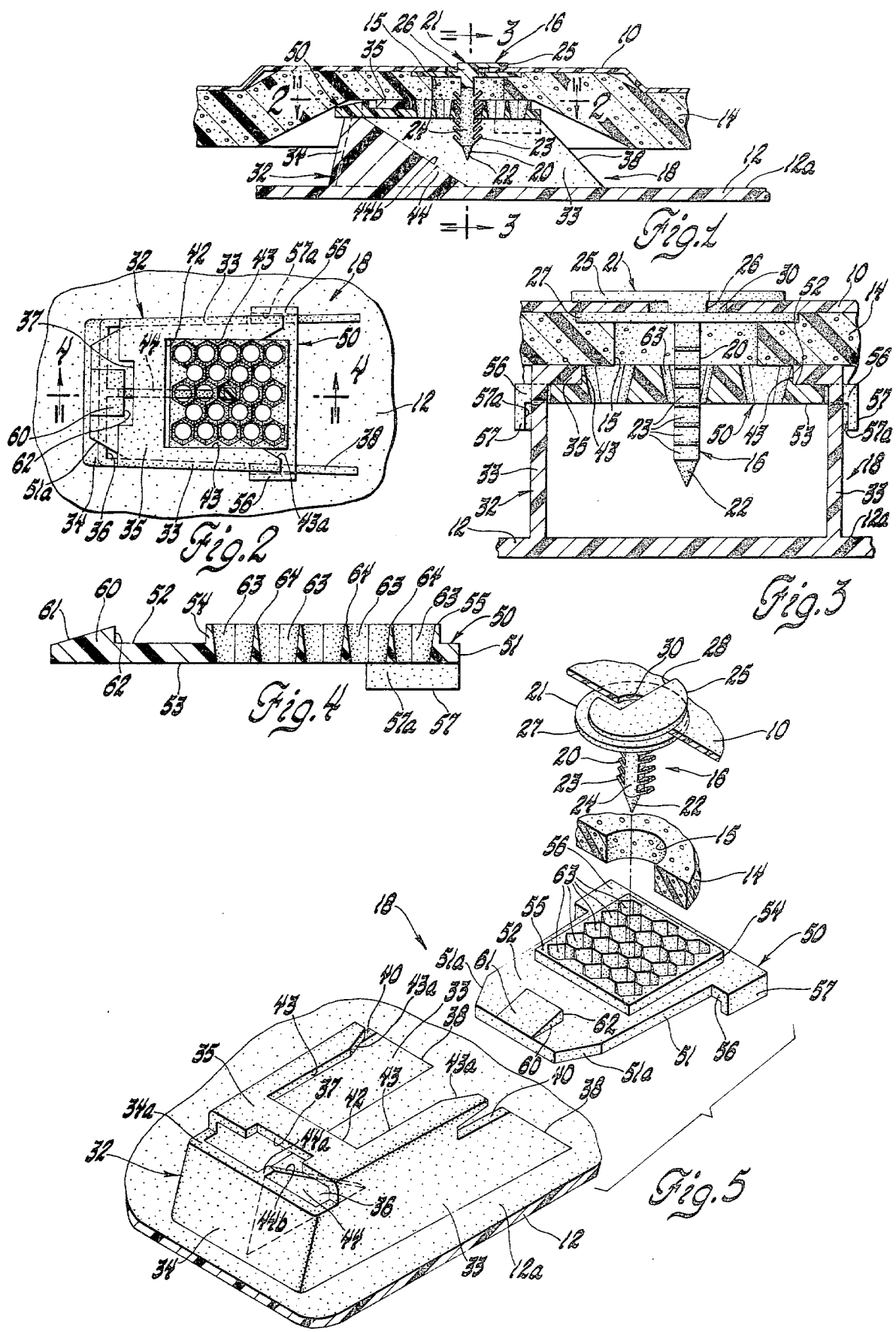

FASTENER MEANS FOR INTERIOR TRIM PANEL

FIELD OF THE INVENTION

This invention relates to fasteners and, in particular, to a fastener means used to mount a trim panel to a support panel such as, for example, the sheet metal inner upper rear quarter panel of an automobile vehicle body.

DESCRIPTION OF THE PRIOR ART

In the assembly present day vehicles bodies, one method commonly used for attaching a quarter upper trim panel to the inner sheet metal structure of the vehicle body is by means of a conventional "Christmas Tree" type studs. In such a structural arrangement, the head of a stud is suitably secured to the trim panel, for example, as by being turned into a slot in a cage that is, as an example, molded into the backside of the trim panel. The shank portion of this stud is then pressed into an associated aperture provided for this purpose in a sheet metal support panel, for example the inner upper rear quarter panel or inner sail panel of the vehicle body. The difficulty with this arrangement is that, since the apertures are formed in the inner quarter panel prior to its assembly to an associated outer quarter panel, the apertures in the inner quarter may not be sufficiently axially aligned with its associated stud due to stack-up tolerances normally encountered during the assembly of various components making up a vehicle body. The problem related to the location of these apertures in the sheet metal panel is of course compounded when more than one fastener is used to effect retention of the quarter upper trim panel to the inner quarter panel.

One proposed solution to the above problem has been disclosed for example in U.S. Pat. No. 3,505,772 entitled "Retainer Including Two Interfitting Parts, " issued Apr. 14, 1979 to James H. DeClaire and Floyd I. Dully. However this proposed solution, as disclosed in the above-identified patent, is only available for use on vehicle bodies of the type wherein an adequate spacing is available between the inner and outer upper rear quarter panels of the vehicle body to receive the webs of one of the fastener elements secured to the inner quarter panel.

SUMMARY OF THE INVENTION

Now in accordance with the invention there is provided an improved fastener means which eliminates the above problem in the assembly of a trim panel to a support panel by the provision of a two-piece, adjustable, multiple-holed cage on the trim panel which is adapted to mate with a modified "Christmas Tree" stud secured to a slot aperture in the sheet metal inner upper rear quarter panel of a vehicle body.

It is therefore a primary object of the present invention to provide a fastener means for securing an interior trim panel to a support panel wherein a multi-holed cage or retainer is used with a push-in type stud to effect attachment of a trim panel to a sheet metal panel in a vehicle body.

Another object of the present invention is to provide an improved fastener means wherein a multi-holed retainer of honeycomb open cell configuration is used to provide multiple apertures whereby at least one of which is adapted to receive and effect alignment of and attachment of the retainer relative to a fixed push-in type stud.

A further object of the present invention is to provide a fastener means of the above type which includes features of construction and assembly rendering it easy and inexpensive to manufacture, assembly and use and which in other respects is suitable for use on production motor vehicle bodies.

For a better understanding of the invention as well as other objects and further features thereof, reference is had to the following detailed description of the invention to be read in connection with the accompanying drawings, wherein:

DESCRIPTION OF THE DRAWINGS

FIG. 1 is a fragmentary cross-sectional view of a portion of a rear quarter panel of a vehicle body having at least one fastener means, in accordance with the invention, used to secure a quarter upper trim panel to the upper rear quarter panel of the vehicle body;

FIG. 2 is a top plan view of the two-piece, multi-holed cage assembly, per se, of the fastener means of FIG. 1 taken on the plan indicated by line 2—2 of FIG. 1;

FIG. 3 is an enlarged transverse cross-sectional view of the portion of the vehicle body and fastener means shown in FIG. 1 taken along line 3—3 of FIG. 1, but with the stud thereof in elevation;

FIG. 4 is an enlarged cross-sectional view of the multi-holed retainer, per se, of the fastener means taken along line 4—4 of FIG. 2; and, FIG. 5 is an exploded perspective view of the assembly of FIG. 1.

DESCRIPTION OF A PREFERRED EMBODIMENT

Referring first to FIGS. 1 and 3, there is illustrated a portion of a vehicle body including an inner upper rear sail or quarter panel 10 to which a decorative, interior, quarter upper trim panel 12 is attached by a fastener means constructed in accordance with the invention. As is conventional, the inner upper rear quarter panel 10 is a sheet metal support panel that extends rearwardly from the rear quarter window, not shown, of the vehicle body. Also as is well known, only one surface, that is the inner surface of panel 10, would be accessible during final assembly of the vehicle body since this panel is normally suitably fixed, as by welding, to an outer rear quarter panel, not shown.

The interior quarter upper trim panel 12 in the embodiment shown, is an ornamental trim panel made of suitable plastic material. As would be conventional, a suitable pad-like sheet 14 of sound insulating material, such as a foam material, is sandwiched between the inner upper rear quarter panel 10 and the trim panel 12. Suitable apertures 15, only one of which is shown, may be provided in the sheet 14 to slidably receive the shank of an associated mounting stud, to be described, or alternately the stud can pierce its own receiving hole through the sheet 14.

Now in accordance with the invention, the trim panel 12 is secured to the inner rear quarter panel 10 by means of one or more fastener means, only one being shown, with each such fastener means including a push-in stud 16 and a fastener device 18.

The push-in stud 16, which is secured to the inner rear quarter panel 10 in a manner to be described, is preferably made of a suitable plastic material, such as an acetal resin, for example Delrin, a trade name for a polyoxymethylene type acetal resin. The push-in stud 16, in the construction illustrated, comprises a shank 20 with a head 21 at one end thereof. Shank 20 is provided with a tapered free and 22 and above this free end, the shank is suitably provided with a plurality of axial shaped apart barb-like projections 23. The barb-like projections 23 can be annular ring like in configuration, or preferably, as shown, these projections 23 can be formed so as to extend only from opposite sides of the shank 20 with opposed flat shank portions 24 therebetween. Preferably, the flat shank portions 24 are provided so as to facilitate turning of the shank 20 by hand to effect assembly of the head 21 of the stud 16 to the quarter panel 10 in a manner to be described.

As best seen in FIGS. 1, 3 and 5, the head 21 of the push-in stud 16 includes an upper head portion 25 of a known type that is insertable by rotation into an aperture in a support panel, a stud shank 26 and a sealing flange 27 from which the shank 20 extends. The head portion 25, as seen in FIG. 5, is in the form of an oval shaped flange with an axially off-set V-shaped recess therein to define an elongated edge 28 which is the leading edge of the head portion 25 during its insertion into a suitably shaped slot aperture 30 provided for this purpose in the quarter panel 10.

It is believed unnecessary for purposes of this invention to describe the head portion 25 in greater detail herein since such rotatably engagable heads are well known in the fastener art, as disclosed for example in U.S. Pat. No. 3,309,955 entitled "Fastener with Rotatable Engaged Head" issued Mar. 21, 1967 to Albert Edward Turnbull and George McDonald.

As shown in FIG. 5, the push-in stud 16 is secured to the quarter panel 10 by first inserting a corner of the head portion 25 adjacent to the edge 28 thereof into the slot aperture 30, after which the stud 16 is turned by its shank 20 in a clockwise direction, as viewed from the shank end of the stud 16, to screw the head portion through the slot aperture 30. A previously described, the flat shank portions 24 are provided to facilitate an operator to effect turning of the stud 16.

In addition, by providing the flat shank portions 24, each slot aperture 30 can, preferably be orientated so that after installation of the associated push-in stud 16 as described, the flats 24 on its shank 20 are aligned in a predetermined relationship relative to fastener device 18, as shown, for a purpose to be described hereinafter.

As shown in FIGS. 1 and 2, the axial extent of the stud shank 26 of stud 16 is preselected relative to the nominal thickness of the quarter panel 10 to which it is to be secured so that, after the head 21 is fixed to the panel in the manner described, the sealing flange 27 will press into abutment against the accessible side of the panel 10, the bottom side of the panel with reference to FIGS. 1, 3 and 5, so that the quarter panel 10 is gripped between head portion 25 and sealing flange 27.

Now in accordance with the preferred illustrated embodiment of the invention, the fastener device 18 is formed as a two-piece assembly so as to include a retainer base 32 and a multi-holed cage or retainer 50, both to be described in detail hereinafter.

The retainer base 32 can be formed as a separate piece which is then suitably secured to the trim panel 12 or preferably, as shown, it can be molded of the same material as that of the trim panel and thus mold-formed integral therewith.

In the construction illustrated, retainer base 32 is of an open box-like configuration and includes a pair of substantially parallel spaced apart side walls 33 extending up from, integral with and at substantially right angles to the backside surface 12a of trim panel 12. These side walls 33 are preferably of trapezoidal shape, with parallel top and bottom edges, with reference to FIGS. 1 and 5, and with non-parallel front and rear edges, right and left, respectively, with reference to FIGS. 1 and 5. As best seen in FIG. 1, the front and rear edges of each side wall 33 are inclined toward each other starting from their bases relative to trim panel 12.

The side walls 33 are interconnected at their rear edges by a rear end wall 34 that extends upward at an acute angle from trim panel 12. Side walls 33 are also interconnected by a top wall 35.

As best seen in FIG. 5, the end wall 34 is of reduced height and top wall 35 is of reduced length relative to side walls 33 and, in addition, each of the side walls 33 is provided with a right angle recess at its top and rear edges whereby there is defined an opening 36 at this rear end of the retainer base 32 for a purpose to be described. In addition, the rear transverse edge of the top wall 35 is also provided with a central recessed detent lock edge 37 for a purpose to be described.

To facilitate assembly of the multi-holed retainer 50 to the retainer base 32, the inclined front edge of each side wall 33 is slopped at a suitable angle whereby to define, in effect, an inclined ramp surface 38 on each of the side walls.

As shown in FIGS. 1 and 5, the ramp surface 38 on a respective side wall 33 terminates at a longitudinal slot recess formed in the side wall 33 whereby there is defined a horizontal support ledge 40 directly beneath and spaced a predetermined distance from the bottom surface of the top wall 35. These ledges 40 thus formed in the side walls 33 provides a shelf support at this end of the retainer base for the trailing end of the multi-holed retainer 50, when the latter is assembled thereto.

As best seen in FIGS. 2 and 5, the top wall 35 is provided with a rectangular shaped slot opening which, in effect, defines a substantially enlarged receiving opening for the shank 20 of the push-in stud 16 for a purpose which will become apparent. This slot opening in the top wall 35 is defined by a transverse edge 42 and by parallel spaced apart longitudinal inner edges 43 each of which terminates at its free end, the right end with reference to FIG. 5, in an inclined guide cam edge 43a.

To provide for added rigidity to the retainer base structure 32 while still permitting it to be made with relatively thin wall thickness, there is provided in the construction shown, a support wall 44 which is positioned to extend upward from the trim panel 12 parallel to the side walls 33 of the retainer base 32 and to extend forward from and centrally of the rear wall 34. The support wall 44 is of the same height as end wall 34 so that the top edge 34a of the end wall and the top edge 44a of the support wall cooperate to also define a shelf support of the rear end of the retainer base 32 which is adapted to support the opposite end of the multi-holed retainer 50 in a manner which will become apparent. In addition, the free edge surface of support wall is suitably inclined at an angle to the surface 12a of trim panel 12 whereby to provide a ramp edge 44b for a purpose to be described.

Referring now to multi-holed retainer 50, it is preferably also molded of a suitable plastic material, such as an acetal resin. The multi-holed retainer 50, in the construction illustrated, includes a substantially flat base member 51 having opposed parallel upper and lower surfaces 52 and 53, respectively, and a central boss 54 extending upward from the surface 52 to terminate at a flat boss surface 55 which is parallel to but spaced above the upper surface 52 of base member 51.

As best seen in FIGS. 2 and 5, the base member 51 is of T-shaped configuration in plan view and includes a pair of transverse outward extending arms 56 at one or trailing end thereof, the right hand end with reference to these Figures. The boss 54 is of rectangular configuration and of a size and thickness to conform to the slot opening defined by the edges 42 and 43 in the top wall 35 of the retainer base 32, and it is located equal distant from opposite sides of the base member 51.

As shown, each arm 56 of the base member 51 terminates at its free end in a depending support flange 57. As best seen in FIGS. 2 and 3, the inner surface 57a of each such flange 57 is preferably outwardly tapered from its trailing edge to its leading edge, right to left with regard to FIG. 2. The transverse extent between the trailing edges of surface 57a of the flange 57 is slightly larger than the width between the outer surfaces of the side walls 33 of the retainer base 32.

The main body portion of base member 51 is of a suitable width, length and thickness so as to be slidably received between the side walls 33 of retainer base 32 whereby the leading edge portion of the base member 51 can extend through the opening 36 at the rear end of the retainer base 32 in a manner so that it will be supported by the top edges 34a and 44a of the rear end wall 34 and support wall 44, respectively, and whereby the trailing end of the base member 51, and in particular, the arms 56 thereof will be supported on the support shelf provided by the ledges 40 on the side walls 33.

In addition, the multi-holed retainer 50 also includes a central upstanding tang 60 formed so as to extend upward from the upper surface 52 of base member 51 adjacent to its leading edge, this tang 60 defining an upwardly inclined ramp surface 61 which terminates at a vertical stop shoulder or detent shoulder 62 facing the boss 54 but suitably spaced therefrom. The spacing between the detent shoulder 62 and the opposed upstanding face of the boss 54 is preferably made a predetermined amount greater than the longitudinal distance between the tang lock edge 37 and the transverse edge 42 of the top wall 35 of the retainer base 32 for a purpose to be described in detail hereinafter.

In accordance with the invention, the multi-holed retainer 50 is provided with a plurality of openings or holes 63 therethrough with the holes being spaced so as to define a thin honeycomb cellular core structure extending across the thickness of the multi-holed retainer 50 from the upper surface 55 of the boss 54 to the lower surface 53 of the base member 51. Preferably, each cellular core wall or membrane between holes 63 at its end adjacent to the surface 55 is tapered substantially to a point as shown at 64 in FIG. 4.

In the embodiment illustrated, each of the holes 63 is of the same size, a predetermined size so that the hole is adapted to receive the shank 20 of the push-in stud 16. In the construction shown, these holes 63 are arranged in a plurality of rows. In the particular embodiment illustrated, there is provided five rows of such holes 63 extending across the transverse width of the boss 54 in a pattern of 5-4-5-4-5 openings per row, from top to bottom with reference to FIG. 2. Thus the multi-holed retainer 50, in the construction shown, is provided with 23 substantially circular holes 63 at surface 53, each such hole 63 gradually generating from a hexagon at surface 55. Preferably, as shown, the axis of the center hole 63 is located in the center of boss 54, and the center axis of a hole 63 and any other adjacent hole 63 is of a predetermined uniform distance.

As best seen in FIG. 3, the internal diameter of each hole 63 adjacent to the lower surface 53 of the retainer is a predetermined amount greater than the minor diameter of the stud shank 20, but less than the nominal outside diameter of the projections 23 on the shank 20.

Referring now to FIG. 5, in the assembly of the multi-holed retainer 50 to the retainer base 32, the leading edge, the left hand edge, of the multi-holed retainer 50 is first inserted loosely between the side walls 33. To facilitate entry of the multi-holed retainer 50 between the side walls 33 of retainer base 32, the leading corners of the base member 51 is provided with suitably chamfered corner edges 51a. Thereafter, as the multi-holed retainer 50 is moved from right to left, with reference to FIG. 5, into the retainer base 32, the leading edge of the base member 51 will engage the ramp edge 44b of support plate 44 which causes this end of the retainer 50 to move upward toward the under surface of top wall 35. As the multi-holed retainer 50 is thus moved, the arms 56 thereof will engage the ramp surfaces 38 of the side walls 33 whereby to cause the trailing end of the retainer 50 to also move upward toward the top wall 35 of retainer base 32.

Upon continued movement of the multi-holed retainer 50 into the retainer base 32, the leading edge of the base member 51 of retainer 50 will move upward so as to rest on the top edges 34a and 44a at the rear or left hand end of the retainer base 32. At the same time, the arms 56 of the retainer will be moved into the slots in the side walls 33 so that the trailing end of the retainer will be supported by the horizontal slot ledges 40 of the side walls 33. When this occurs, the inner tapered surfaces 57a of the support flanges 57 at the ends of arms 56 will effect centering of the base member 51 of the multi-holed retainer 50 relative to the retainer base 32 so that with the boss 54 thereon thus being aligned to be slidably received between the inner edges 43 of the top wall 35.

In the final assembled position of these two elements as shown in FIGS. 1, 2 and 3, the support flanges 57 will extend downward over the outer surfaces of the side walls 33. As thus located, support flanges 57 will act as side supports for this end of the side walls 33 so as to prevent them from being bowed outward when a load is applied onto the multi-holed retainer 50 in a direction toward and substantially at right angles to the trim panel 12.

It will also be apparent that as the leading edge of the base member 51 of multi-holed retainer 50 is moved upward with reference to FIG. 5, as described above, the inclined surface 61 abutting against top wall 35 will cause either the top wall 35 or the base member 51 or both to flex sufficiently to permit this leading end of the base member 51 to enter slot opening 36, after which these elements can snap back relative to each other so that the detent 62 is positioned whereby it can abut against the tang lock edge 37 of retainer base 32 so as to prevent inadvertent withdrawal of the multi-holed retainer 50 from the retainer base 32. That is, movement of the retainer 50 in retainer base 32 in a left to right direction with reference to FIGS. 1, 2 and 5, will be limited by detent 62 abutting against boss 54.

It will now be apparent to those skilled in the art that, theoretically a push-in stud 16 is located on the quarter panel 10 so that the axis of its shank 20 would normally align with the center of the stud receiving opening in the top wall 35 of the retainer base 32, and thus it would be substantially aligned co-axial with the center hole 63 in the multi-holed retainer 50. Of course, as previously described, in the actual assembly of such mass production parts, because of the usual stack-up tolerances encountered as various parts of the vehicle body are assembled, such alignment will not be maintained. However, by providing a multi-holed retainer 50 in accordance with the invention that is movably secured to the retainer base 12, non-alignment of the stud 16 will not present a problem, since the subject fastener means will accommodate any such normal misalignment in a manner to be described.

After each of the multi-holed retainers 50 is secured to an associated retainer base 32 on a trim panel 12, the trim panel 12 is then ready to be attached to the inner quarter panel 10 of a vehicle body with the insulating sheet 14 positioned therebetween. The insulating sheet 14 is suitably positioned relative to the panel 10 so that the shank 20 of an associated push-in stud 16 extends through its respective aperture 15 in the insulating sheet.

The trim panel 12 is then aligned by an assembler relative to the upper rear quarter panel 10, after which the trim panel is then pushed toward the panel 10 so that the shank 20 of a push-in stud 16 will begin to enter into one of the holes 63 in an associated fastener device 18. If at that time the axis of the shank 20 is not aligned with the axis of an associated hole 63, the tapered free end 22 of the stud can still begin to enter the hole 63 most nearly aligned with the stud. The tapered edge 64 adjacent to such hole will prevent the shank 20 of the push-in stud 16 from abutting against the upper surface of the multi-holed retainer and thus preventing its entry into a hole 63.

If the stud 16 and a hole 63 in the multi-holed retainer 50 are not properly aligned, then as the tip of the stud enters the hole, the stud 16 can effect displacement of the multi-holed retainer 50 accordingly in a longitudinal direction relative to the retainer base 32 to effect co-axial alignment in at least this direction.

The movement of the multi-holed retainer 50 in this longitudinal direction relative to the retainer base 32 is made possible, as best seen in FIG. 2, by making the distance between the detent lock edge 37 and the transverse edge 42 of top wall 35 a predetermined desired amount less than the distance between the detent shoulder 62 and the leading edge of boss 54 of the multi-holed retainer 50 whereby this retainer is free to move a limited extent either fore or aft in a longitudinal direction relative to retainer base 32 while still being releasably secured thereto.

Any limited non-alignment of the shank 20 of a stud 16 relative to the axis of that associated hole 63 in a transverse direction is compensated for by the diameter of shank 26 moving in the slot aperture 30 in the quarter panel 10 of the shank 20 relative to the inside diameter of the holes 63. For this purpose, each push-in stud 16 is fixed to the quarter panel 10 so that the flats 34 of its shank 20 will be aligned substantially parallel to the side walls 33 of an associated retainer base 32.

Of course, by making push-in studs 16 of a suitable plastic material that is suitably flexible, some flexing of the shank 20 relative to the head 21 of the stud can also occur to compensate for any minor non-alignment in a transverse direction of the stud 16 relative to an associated hole 63.

As will be apparent, the trim panel 12 is pushed toward the rear quarter panel 10 sufficiently so as to slightly compress the insulating sheet 14 in the immediate area of the fastener joint between the upper surface of the fastener device 18 and quarter panel 10. At the same time, the shank 20 of the push-in stud 16 is forced to penetrate the associated hole 63 in the multi-holed retainer so that at least one set of the projections 23 on the shank can spring outward after passage through the hole 63 to engage the lower surface 53 of the multi-holed retainer 50 whereby to effect locking engagement of the stud thereto.

While the invention has been described with reference to a particular embodiment disclosed herein, it is not confined to the details set forth since it is apparent that various modifications can be made by those skilled in the art without departing from the scope of the invention. For example, although the pattern of the holes 63 and hole receiving portion of the multi-holed retainer 50 are shown to be of rectangular configuration, it would be apparent that these plural holes 63 can be provided in a somewhat circular pattern and that any number of holes 63 may be used depending on the stack-up tolerance variations that can be expected in a particular assembly application. This application is therefore intended to cover such modifications or changes as may come within the purposes of the invention as defined by the following claims.

The embodiments of the invention in which an exclusive property or privilege is claimed are defined as follows:

1. A fastener means to effect the attachment together of a first panel, having the shank of a push-in stud extending outward from one side thereof, and a second panel, said fastener means including a retainer base adapted to be fixed on said second panel, said retainer base having a fastener receiving opening therein for reception of the push-in stud, said opening being substantially larger than the maximum outside diameter of the shank of the stud; and, a multi-holed retainer having opposed inboard and outboard surfaces thereon and mounting means adjacent to its outer edges adapted to effect attachment of said multi-holed retainer to said retainer base so that said outboard surface faces away from the second panel with said multi-holed retainer positioned so as to overlie said enlarged opening in said retainer base while still permitting limited movement of said multi-holed retainer on said retainer base in a plane parallel to and spaced from the second panel, said multi-holed retainer having a plurality of spaced apart stud receiving holes therethrough of a size for the normal reception of the stud, said holes being grouped in the central portion of said multi-holed retainer and arranged in a pattern to overlie substantially the entire area of said enlarged fastener receiving opening, said stud receiving holes being spaced closely adjacent to each other so as to define a honeycomb cellular structure having a thin core wall separating adjacent said stud receiving holes, each said core wall adjacent to said outboard surface being tapered so as to define a substantially sharp edge at said outboard surface whereby to effect guiding of the shank of the push-in stud into an associated said hole during assembly of the second panel to the first panel and so as to permit the shank of the stud to effect movement of said multi-holed retainer as the push-in stud is inserted into the associated said stud receiving hole to effect substantially alignment of the stud therewith.

2. A fastener means to effect the attachment together of a second panel to a first panel, said first panel having a push-in stud fixed thereto with the shank of the stud extending from the first panel toward the second panel, said fastener means comprising a retainer base and a multi-holed retainer, said fastener means being of open box like configuration and adapted with an apertured top wall, said retainer base being adapted to be secured to the second panel with said top wall spaced from and parallel to the second panel, said top wall having an aperture therein defining an opening for reception of the shank of the push-in stud which opening is substantially larger than the maximum outside diameter of the shank of the stud, said multi-holed retainer having opposed inboard and outboard surfaces thereon and mounting means adjacent to its outer edges adapted to effect attachment of said multi-holed retainer to said retainer base so that said outboard surface faces away from the second work piece with said multi-holed retainer positioned so as to overlie said enlarged opening while still permitting limited movement of said multi-holed retainer in a plane parallel to the second work piece, said multi-holed retainer having a plurality of spaced apart stud receiving holes therethrough grouped in the pattern to overlie substantially the entire area of the enlarged opening when said multi-holed retainer is secured to the second work piece, said stud receiving holes being spaced closely adjacent to each other so as to define a honeycomb cellular structure having a thin core wall separating adjacent said stud receiving openings, each said core wall adjacent to said outboard surface being tapered so as to define a substantially sharp edge at said outboard surface whereby to effect guiding of the tip of the push-in stud into a said hole so that the stud upon entering said hole will engage said core wall so as to effect axial alignment of the stud with the axis of the most nearly aligned said hole by lateral displacement of said multi-holed retainer as the push-in stud is inserted into the associated said hole whereby to effect substantially alignment of the stud therewith.

3. A fastener device to effect the attachment together of a first panel having the shank of a push-in stud extending therefrom and a second panel having a fastener receiving means defining an opening for reception of the push-in stud which opening is substantially larger than the maximum outside diameter of the shank of the stud, said fastener device including a multi-holed retainer having opposed inboard and outboard surfaces thereon and mounting means adjacent to its outer edges adapted to effect attachment of said multi-holed retainer to the fastener receiving means so that said outboard surface faces away from the second panel with said multi-holed retainer positioned so as to overlie the enlarged opening while still permitting limited movement of said multi-holed retainer in a plane parallel to the second panel, said multi-holed retainer having a plurality of spaced apart stud receiving holes therethrough grouped in the pattern to overlie substantially the entire area of the enlarged opening when said multi-holed retainer is secured to the second work piece, said holes being spaced closely adjacent to each other so as to define a honeycomb cellular structure having a thin core wall separating adjacent said stud receiving openings, each said core wall adjacent to said outboard surface being tapered so as to define a substantially sharp edge at said outboard surface whereby to effect guiding of the free end shank tip of the push-in stud into a said hole so that the stud upon entering said hole will engage said core wall so as to effect axial alignment of the stud with the axis of the most nearly aligned said hole by lateral displacement of said multi-holed retainer as the push-in stud is inserted into the associated said hole whereby to effect substantially alignment of the stud therewith.

* * * * *